US008287167B2

(12) United States Patent
Inaba

(10) Patent No.: US 8,287,167 B2
(45) Date of Patent: Oct. 16, 2012

(54) LAMP UNIT

(75) Inventor: Tetsuaki Inaba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 299 days.

(21) Appl. No.: 12/749,005

(22) Filed: Mar. 29, 2010

(65) Prior Publication Data

US 2010/0246204 A1 Sep. 30, 2010

(30) Foreign Application Priority Data

Mar. 31, 2009 (JP) ................................. 2009-086888

(51) Int. Cl.
*B60Q 1/04* (2006.01)

(52) U.S. Cl. ........................................ 362/539; 362/518

(58) Field of Classification Search .................. 362/508, 362/516, 518, 519, 539
See application file for complete search history.

(56) References Cited

U.S. PATENT DOCUMENTS

2007/0177401 A1* 8/2007 Nakabayashi ................ 362/548
2007/0268717 A1* 11/2007 Iwasaki ......................... 362/539

FOREIGN PATENT DOCUMENTS

JP 2008-243476 A 10/2008

OTHER PUBLICATIONS

English abstract of JP2008243476 published on Oct. 9, 2008, esp@cenet database, 1 page.

* cited by examiner

*Primary Examiner* — David V Bruce
(74) *Attorney, Agent, or Firm* — Osha Liang LLP

(57) ABSTRACT

A lamp unit includes a first semiconductor light-emitting element that serves as a light source; a second semiconductor light-emitting element that serves as a light source; a support member that supports the first semiconductor light-emitting element and the second semiconductor light-emitting element; a first reflector provided above the first semiconductor light-emitting element, which reflects light radiated from the first semiconductor light-emitting element forward; a shade that blocks a portion of reflected light from the first reflector; a projection lens provided in front of the first reflector with the shade disposed therebetween, which forms a light distribution pattern with a cut-off line from light reflected by the first reflector; a positioning portion that positions the projection lens; and a second reflector provided below the second semiconductor light-emitting element, which reflects light radiated from the second semiconductor light-emitting element forward.

18 Claims, 9 Drawing Sheets

LAMP UNIT

BACKGROUND OF INVENTION

1. Field of the Invention

The present invention relates to a lamp unit. More specifically, the present invention relates to a lamp unit having a semiconductor light-emitting element as a light source.

2. Related Art

A conventional vehicular headlamp ordinarily has a constitution that enables the formation of a low-beam distribution pattern having a cut-off line on an upper end edge thereof. Consequently, the forward visibility of the host vehicle's driver can be ensured to the greatest extent possible while also ensuring that no glare is directed at pedestrians and the drivers of oncoming vehicles.

In recent years, a constitution employing an LED, unlike conventional incandescent lamps and discharge lamps, has been studied for use as a light source of the vehicular headlamp. The output per LED of a vehicular headlamp that uses an LED as a light source is smaller than that of an incandescent lamp and a discharge lamp. Therefore, the use of a plurality of LEDs to obtain a desired amount of light for the formation of a low-beam distribution pattern has also been studied.

Patent Document 1 describes a vehicular lighting fixture that combines a first optical unit, which has a semiconductor light-emitting element as a light source and is suited for forming a cut-off line, and a second optical unit, which has a semiconductor light-emitting element as a light source and is suited for widely diffusing a large amount of light.

[Patent Document 1] Japanese Patent Application Laid-Open (Kokai) No. 2008-243476

SUMMARY OF INVENTION

However, in the above vehicular lighting fixture, a base member in the first optical unit that has an edge line for forming the cut-off line of the low-beam distribution pattern, and an extension in the second optical unit that is formed with a second main reflector for reflecting light from the semiconductor light-emitting element forward are formed as separate members. A mechanism and process are thus required for adjusting the optical axes of each unit, and there is still room for improvement.

One or more embodiments of the present invention provide art that accurately aligns optical axes of a plurality of optical units having a semiconductor light-emitting element as a light source.

In one or more embodiments, a lamp unit includes a first semiconductor light-emitting element that serves as a light source; a second semiconductor light-emitting element that serves as a light source; a support member that supports the first semiconductor light-emitting element and the second semiconductor light-emitting element; a first reflector provided above the first semiconductor light-emitting element, which reflects light radiated from the first semiconductor light-emitting element forward; a shade that blocks a portion of reflected light from the first reflector; a projection lens provided in front of the first reflector with the shade disposed therebetween, which forms a light distribution pattern with a cut-off line from light reflected by the first reflector; a positioning portion that positions the projection lens; and a second reflector provided below the second semiconductor light-emitting element, which reflects light radiated from the second semiconductor light-emitting element forward. In the lamp unit, the shade, the positioning portion, and the second reflector are integrally molded as a composite part.

According to this form, the shade that blocks a portion of light radiated from the first semiconductor light-emitting element and reflected by the first reflector, the positioning portion that positions the projection lens that forms a light distribution pattern using such reflected light, and the second reflector that reflects light radiated from the second semiconductor light-emitting element forward are integrally molded as the composite part. Therefore, by precisely assembling the support member that supports the plurality of semiconductor light-emitting elements to the composite part, optical axes of an optical unit having the first semiconductor light-emitting element as a light source and an optical unit having the second semiconductor light-emitting element as a light source can both be easily and accurately aligned.

The shade may have a reflective surface that further reflects a portion of light reflected by the first reflector toward the projection lens. The brightness of the light distribution pattern is consequently increased because the portion of light blocked by the shade also contributes to the formation of the light distribution pattern.

The composite part may be formed with an insertion portion into which the second semiconductor light-emitting element, which is fixed on a lower surface side of the support member, is inserted so as to face a reflective surface of the second reflector. Thus, the second semiconductor light-emitting element supported by the support member can be disposed at a position facing the reflective surface of the second reflector without making the configuration of the composite part more complex.

At least a portion of the support member mounted with the first semiconductor light-emitting element and the second semiconductor light-emitting element may be formed from a metal material. Accordingly, the heat radiation performance of the semiconductor light-emitting elements increases, so there is no need to consider the heat radiation performance of the composite part. The composite part can thus be produced by injection molding of resin, which can reduce production costs and improve part accuracy.

According to one or more embodiments of the present invention, optical axes of a plurality of optical units having a semiconductor light-emitting element as a light source can be easily and accurately aligned.

Other aspects and advantages of the invention will be apparent from the following description, the drawings and the claims.

DETAILED DESCRIPTION

Figure 1:
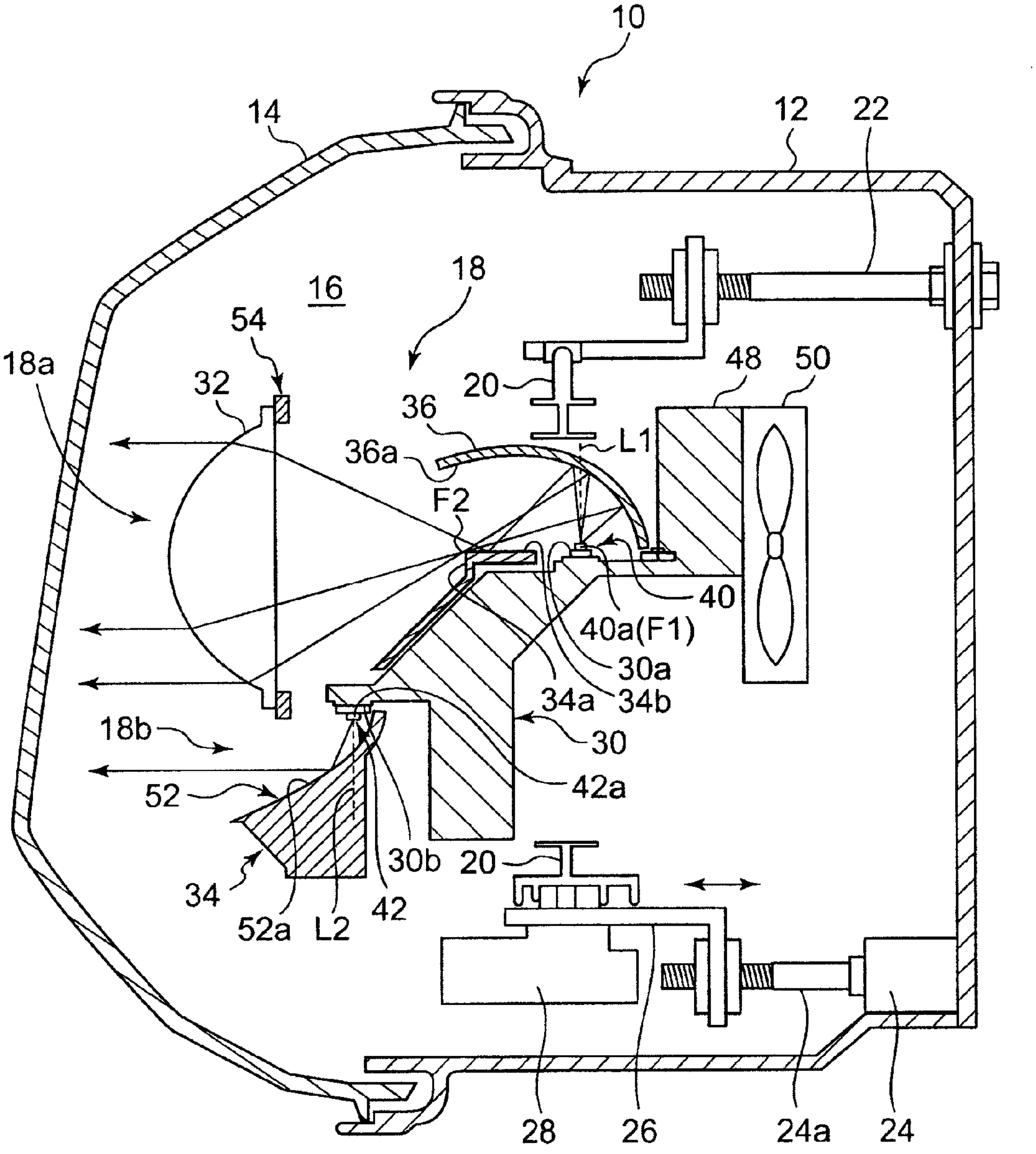
FIG. 1 is a cross-sectional view of a vehicular headlamp apparatus provided with a lamp unit according to one or more embodiments.

Hereinafter, embodiments of the present invention will be described in detail with reference to the accompanying drawings. In descriptions of the drawings, like reference numerals are assigned for like elements, and duplicate descriptions are omitted as appropriate.

Figure 2:
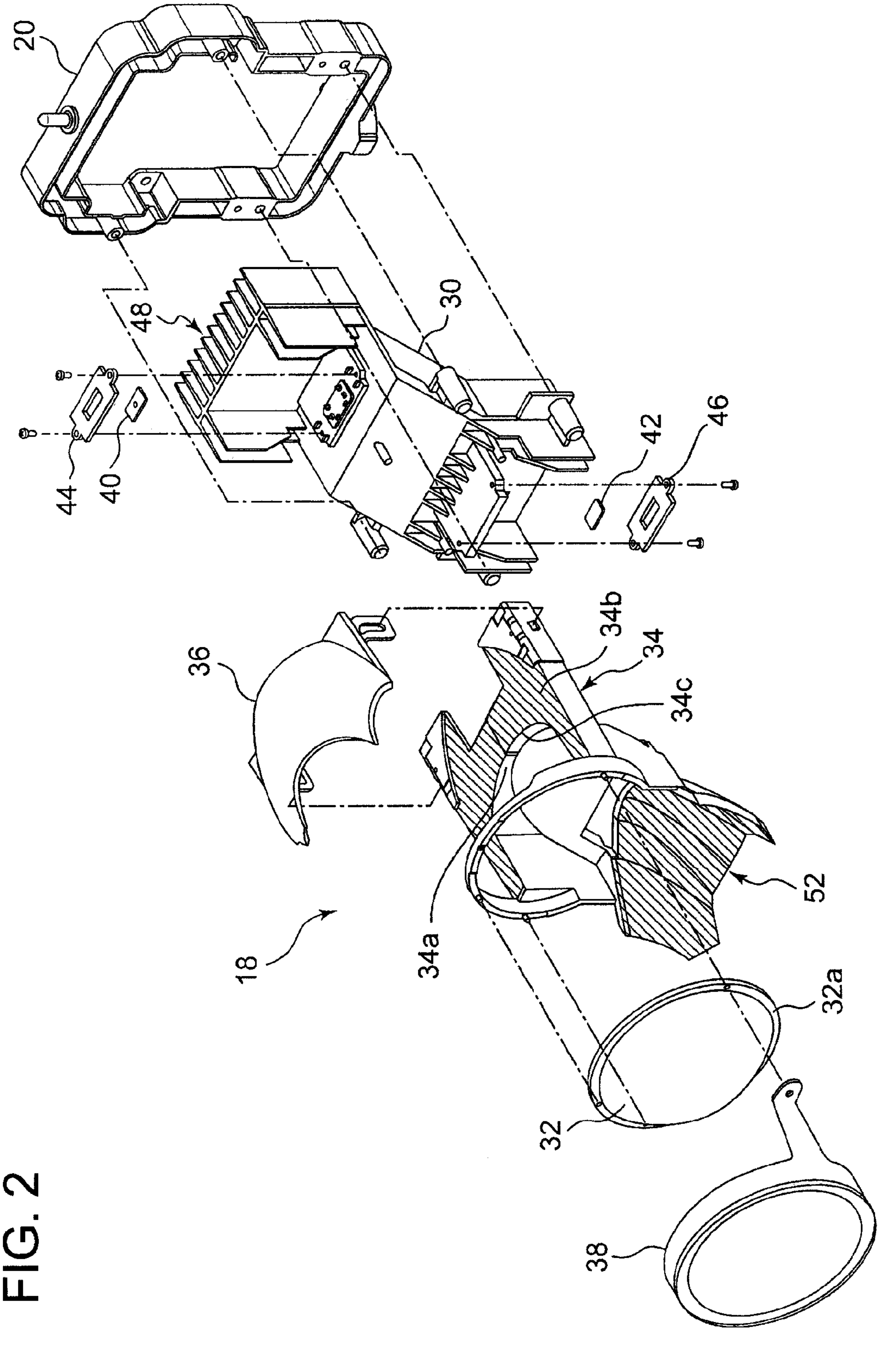
FIG. 2 is an exploded perspective view of the lamp unit according to one or more embodiments.
Figure 3:
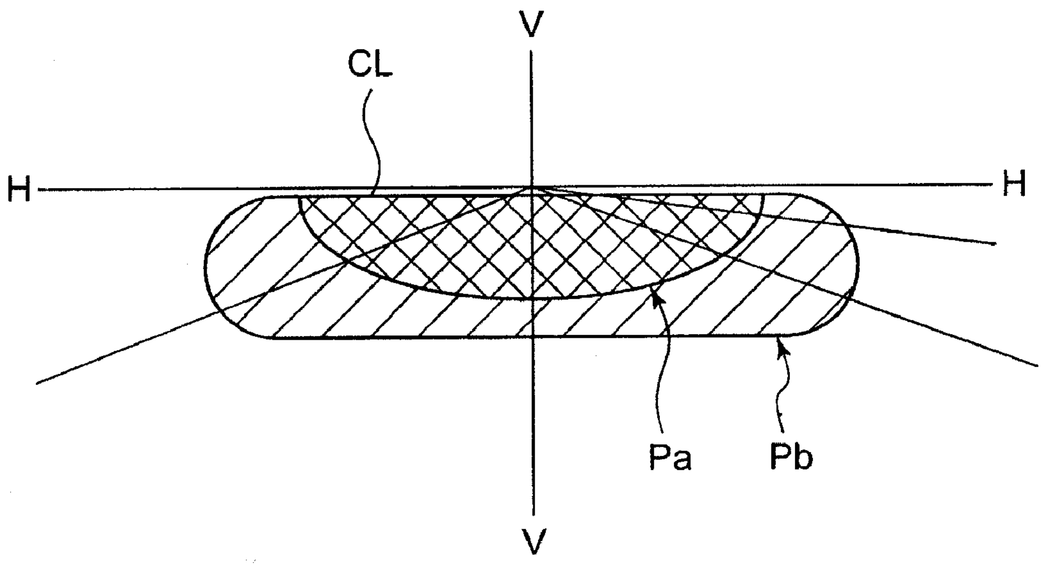
FIG. 3 is a view that shows low-beam distribution patterns formed on a virtual vertical screen positioned in front of the vehicular headlamp apparatus by light that is radiated from the vehicular headlamp apparatus according to one or more embodiments.

A vehicular headlamp apparatus according to one or more embodiments is provided with a plurality of optical units, and optical axes of the optical units can be easily and accurately aligned. FIG. 1 is a cross-sectional view of the vehicular headlamp apparatus provided with a lamp unit according to one or more embodiments. FIG. 2 is an exploded perspective view of the lamp unit according to one or more embodiments. FIG. 3 is a view that shows low-beam distribution patterns formed on a virtual vertical screen positioned 25 meters in front of the vehicular headlamp apparatus by light that is radiated from the vehicular headlamp apparatus according to one or more embodiments.

A vehicular headlamp apparatus 10 may be a headlamp attached to a front end portion of a vehicle and capable of turning a low beam on and off. In FIG. 1, a headlamp unit attached to a front right-hand portion of a vehicle such as an automobile is shown as an example of the vehicular headlamp apparatus 10.

The vehicular headlamp apparatus 10 has a lamp body 12 and a translucent cover 14 with light transparency, as shown in FIGS. 1 and 2. A lamp unit 18 is fixedly disposed within a lamp chamber 16 that is surrounded by the translucent cover 14 and the lamp body 12. The lamp unit 18 is fixed to a swivel frame 20 and supported by the lamp body 12 via an aiming screw 22 and a leveling actuator 24.

In the leveling actuator 24, the rotation of a built-in driving portion causes a shaft 24*a* to rotate so that a support plate 26 supporting the bottom of the swivel fume 20 moves in the vehicle longitudinal direction, whereby the leveling actuator 24 changes an optical axis in the vertical direction. A swivel actuator 28 is disposed at a bottom portion of the support plate 26 so as to connect to the swivel frame 20. The swivel actuator 28, due to the rotation of a built-in driving portion, pivots the lamp unit 18 in the vehicle left and right directions using the bottom portion of the swivel frame 20 as a fulcrum.

The lamp unit 18 includes a support member 30 that supports a plurality of LED modules, a projection lens 32, a composite part 34, a first reflector 36 for a projector unit, and an extension frame 38 that covers an edge portion of the projection lens 32.

The support member 30 supports a first semiconductor light-emitting element (LED) 40, which is a first light source, on a support surface 30*a* that is formed on an upper surface side thereof, and supports a second semiconductor light-emitting element (LED) 42, which is a second light source, on a support surface 30*b* that is formed on a lower side thereof. The first semiconductor light-emitting element 40 and the second semiconductor light-emitting element 42, as shown in FIG. 2, are attached and fixed to the respective support surfaces by power sockets 44, 46. At a rear end portion, the support member 30 is also provided with a heat radiation fin 48 and a heat radiation fan 50, which can efficiently discharge heat generated by the first semiconductor light-emitting element 40 and the second semiconductor light-emitting element 42 to the outside.

The vehicular headlamp apparatus 10 is constituted so as to form a low-beam distribution pattern by combining light radiated from the two light sources of the lamp unit 18. Among the lamp unit 18, a first optical unit 18*a* having the first semiconductor light-emitting element 40 as a light source forms a light distribution pattern Pa that has a cut-off line CL below a horizon line H-H (see FIG. 3).

As shown in FIG. 1, the first optical unit 18*a* includes the first semiconductor light-emitting element 40 that acts as the first light source and is fixedly disposed on the support surface 30*a* of the support member 30, a first reflector 36 that is above the first semiconductor light-emitting element 40 and reflects light from the first semiconductor light-emitting element 40 forward, a composite part 34 that is disposed in front of the support member 30, and a projection lens 32 that is held by the composite part 34.

The first semiconductor light-emitting element 40 is a white light-emitting diode with a light-emitting portion 40*a* (light-emitting chip) that is approximately 1 square millimeter in size. The first semiconductor light-emitting element 40 is also mounted on the support surface 30*a* of the support member 30 in such a state that an irradiation axis L1 thereof is oriented generally upward and generally perpendicular to an irradiation direction (left direction in FIG. 1) of the first optical unit 18*a*. It should be noted that the light-emitting portion 40*a* may be structured so as to be disposed at a slight angle depending on the shape of the light-emitting portion and the distribution of light radiated forward. In addition, a plurality of light-emitting portions (light-emitting chips) may be provided in one semiconductor light-emitting element.

The first reflector 36 has a vertical cross section with a generally elliptical shape. The first reflector 36 is a reflective member formed with a reflective surface 36*a* on an inner side thereof. The reflective surface 36*a* has a free-form curved surface shape whose horizontal cross section is based on an ellipse. The first reflector 36 is designed and arranged such that a first focal point F1 thereof is in the vicinity of the light-emitting portion 40*a* of the first semiconductor light-emitting element 40, and a second focal point F2 thereof is positioned in the vicinity of an edge line 34*c* formed by a curved surface 34*a* and a horizontal surface 34*b* of the composite part 34.

Light radiated from the light-emitting portion 40*a* of the first semiconductor light-emitting element 40 is reflected by the reflective surface 36*a* of the first reflector 36, and passes in the vicinity of the second focal point F2 before reaching the projection lens 32. The first optical unit 18*a* is structured such that light is partially reflected by the horizontal surface 34*b*, with the edge line 34*c* of the composite part 34 acting as a border line, and as a consequence, light is selectively cut so as to form the cut-off line CL on a light distribution pattern projected forward of the vehicle. In other words, the horizontal surface 34*b* and the edge line 34*c* of the composite part 34 function as shades. In addition, the edge line 34*c* is structured as a light-dark border line of the first optical unit 18*a*.

It should be noted that a portion of light reflected by the reflective surface 36*a* of the first reflector 36 and further reflected by the horizontal surface 34*b* of the composite part 34 is also preferably radiated forward as effective light. Accordingly, in one or more embodiments, a vehicle front side of the horizontal surface 34*b* of the composite part 34 has an optical configuration whose reflection angle is suitably set in consideration of the positional relationship with the projection lens 32 and the first reflector 36. Namely, the horizontal surface 34*b* functions as a reflective surface that further reflects a portion of light reflected by the first reflector toward the projection lens. The brightness of the light distribution pattern is consequently increased because the portion of light blocked by the horizontal surface 34*b* also contributes to the formation of the light distribution pattern. In other words, even when using a semiconductor light-emitting element with less output, a light distribution pattern of a desired brightness can be formed. Therefore, it is possible to decrease power consumption and reduce costs.

The projection lens 32 is a convex type of aspheric lens that projects light reflected by the reflective surface 36*a* of the first reflector 36 forward of the vehicle. The projection lens 32 is fixed in the vicinity of a tip end portion on the vehicle front side of the composite part 34. That is, the projection lens 32 is provided in front of the first reflector 36 with the horizontal surface 34*b* disposed therebetween, and forms a light distribution pattern with a cut-off line from light reflected by the first reflector 36. In one or more embodiments, a rearward side focal point of the projection lens 32 is structured so as to generally coincide with the second focal point F2 of the first reflector 36. Accordingly, light reflected by the first reflector 36 and incident to the projection lens 32 is projected forward as generally parallel light flux. In other words, the first optical unit 18*a* in one or more embodiments is structured as a reflecting projector type lamp unit for condensed cut-off line formation.

A second optical unit 18*b* will be described next. The second optical unit 18*b* is a unit that forms a low-beam distribution pattern together with the first optical unit 18*a* described above, and is disposed below the first optical unit 18*a*. The second optical unit 18*b* forms a larger diffusion area forming pattern Pb that spreads out more than the diffusion area forming pattern Pa formed by the first optical unit 18*a* (see FIG. 3).

As shown in FIGS. 1 and 2, the second optical unit 18*b* includes the second semiconductor light-emitting element 42 that acts as the second light source and is fixedly disposed on the support surface 30*b* of the support member 30, and a second reflector 52 that is below the second semiconductor light-emitting element 42 and reflects light radiated from the second semiconductor light-emitting element 42 forward.

The second semiconductor light-emitting element 42 is a white light-emitting diode with a light-emitting portion 42*a*, similar to the first semiconductor light-emitting element 40. The second semiconductor light-emitting element 42 is also mounted on the support surface 30*b* of the support member 30 in such a state that an irradiation axis L2 thereof is oriented generally downward and generally perpendicular to an irradiation direction (left direction in FIG. 3) of the second optical unit 18*b*.

The second reflector 52 is a reflective member whose inner side is formed with a reflective surface 52*a* that uses a cylindrical paraboloid surface as a reference surface and an axis passing through the light-emitting portion 42*a* as a focal point. Light radiated from the light-emitting portion 42*a* of the second semiconductor light-emitting element 42 is reflected by the reflective surface 52*a* of the second main reflector 52, and irradiated forward of the vehicle. In other words, the second optical unit 18*b* in one or more embodiments is structured as a reflective type of lamp unit.

Note that for the vehicular headlamp apparatus 10 of one or more embodiments, the first light source of the first optical unit 18*a* and the second light source of the second optical unit 18*b* are structured by the first semiconductor light-emitting element 40 and the second semiconductor light-emitting element 42, respectively. By thus employing the semiconductor light-emitting elements 40, 42 that are generally compact light-emitting diodes (LEDs) with low power consumption as the light sources of the vehicular headlamp apparatus 10, the effective use of limited power is possible.

In the first optical unit 18*a* and the second optical unit 18*b* of one or more embodiments, the support surface 30*a* for the first semiconductor light-emitting element 40 and the support surface 30*b* for the second semiconductor light-emitting surface 42 are integrally formed as portions of the support member 30. Therefore, the positions of both light sources can be easily and accurately determined by mounting and fixing the first semiconductor light-emitting element 40 and the second semiconductor light-emitting element 42 to the support surface 30*a* and the support surface 30*b*, respectively.

Figure 4:
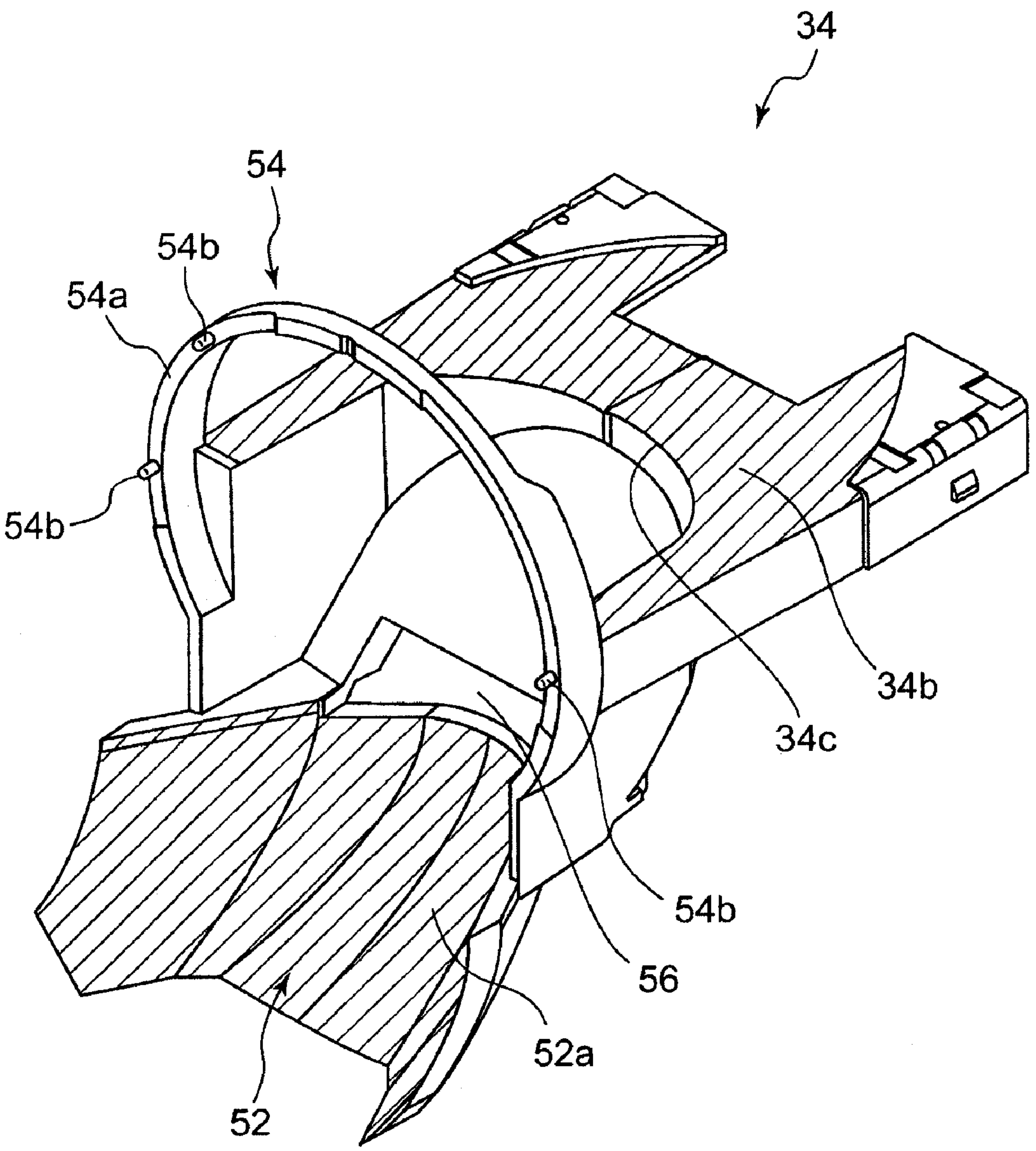
FIG. 4 is a perspective view that shows an overview of a composite part according to one or more embodiments.
Figure 5:
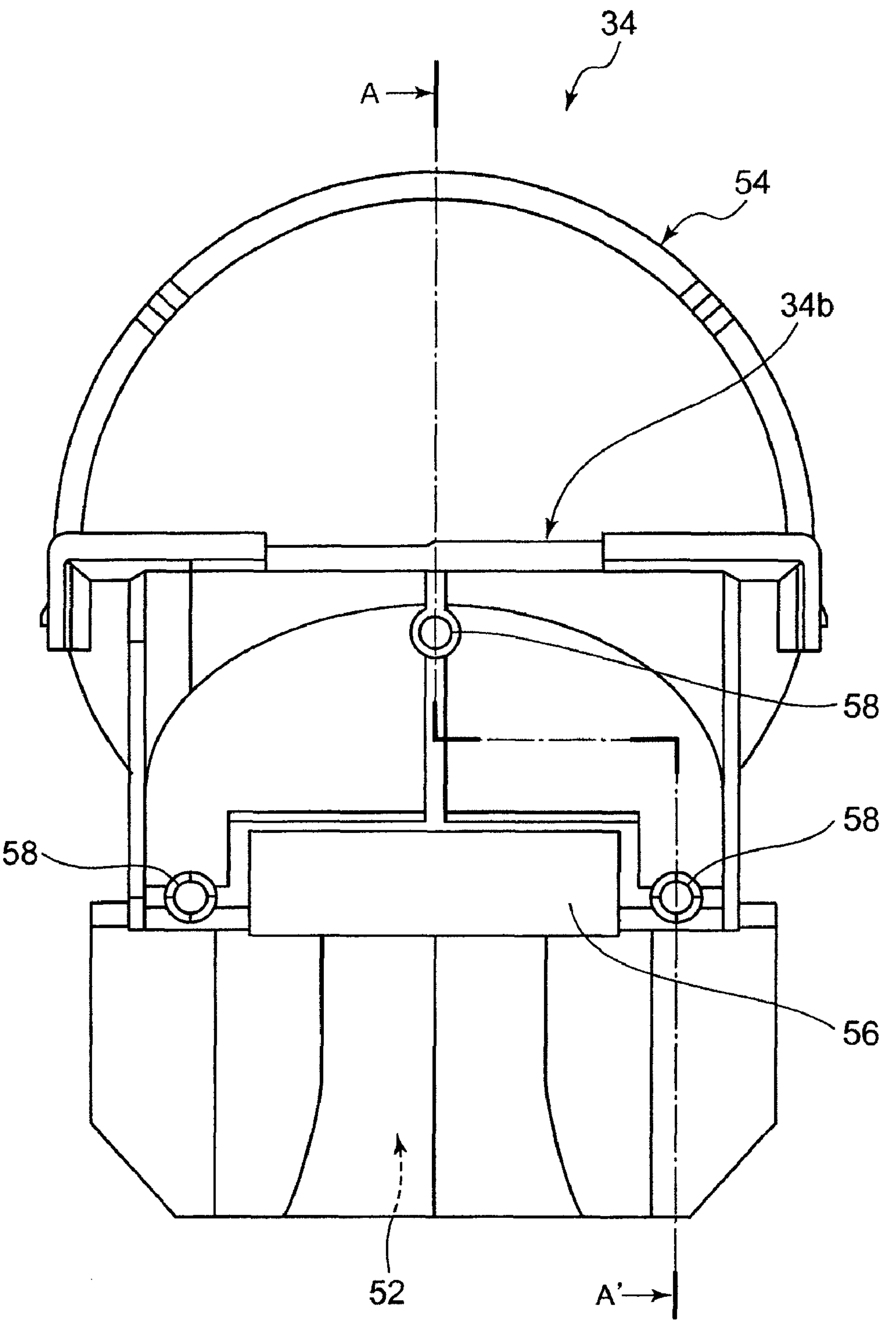
FIG. 5 is a back view of the composite part as seen from the rear.
Figure 6:
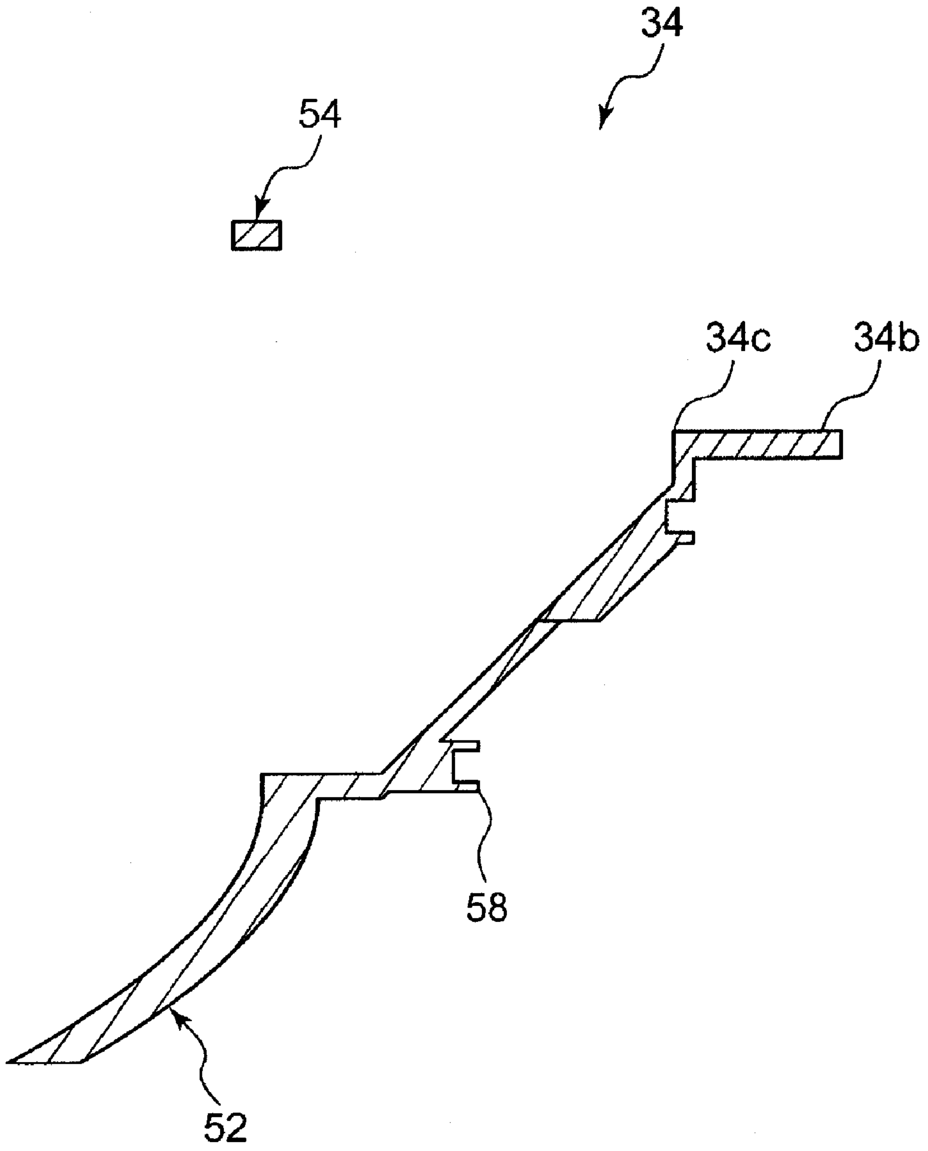
FIG. 6 is a cross-sectional view taken along a line A-A' in FIG. 5.

Next, the composite part 34 will be described. FIG. 4 is a perspective view that shows an overview of the composite part according to one or more embodiments. FIG. 5 is a back view of the composite part as seen from the rear. FIG. 6 is a cross-sectional view taken along a line A-A' in FIG. 5. The composite part 34 is a resin part produced as one part by injection molding. As described earlier, in the composite part 34, the horizontal surface 34*b* and the edge line 34*c* functioning as shades, the second reflector 52, and a positioning portion 54 that positions the projection lens 32 are integrally molded. The horizontal surface 34*b* and the second reflector 52 are metallic reflective surfaces formed by deposition.

The positioning portion 54 is ring-shaped, and has a positioning surface 54*a* where the projection lens 32 is positioned by contacting an edge portion 32*a* of the projection lens 32 to an edge portion of the positioning portion 54, and a projection-like welding portion 54*b* that is fitted to a hole formed in the edge portion of the projection lens 32 and fixed by means of welding. The composite part 34 is formed with an insertion opening 56 into which the second semiconductor light-emitting element 42, which is fixed on the lower surface side of the support member 30, is inserted so as to face the reflective surface 52*a* of the second reflector 52.

As described above, in the lamp unit 18, the positioning portion 54, which positions the horizontal surface 34*b* and the projection lens 32 and which has a large effect on the formation (optical axis) of the light distribution pattern formed by the first optical unit 18*a*, and the second reflector 52, which has a large effect on the formation (optical axis) of the light distribution pattern formed by the second optical unit 18*b*, are integrally molded as a composite part. Therefore, by precisely assembling the support member 30 that supports the plurality of semiconductor light-emitting elements to the composite part 34 by means described later, the optical axes of the first optical unit 18*a* having the first semiconductor light-emitting element 40 as a light source and the second optical unit 18*b* having the second semiconductor light-emitting element 42 as a light source can both be easily and accurately aligned.

As shown in FIG. 5, a surface on the vehicle rearward side of the composite part 34 is provided with an abutted portion 58 at three locations. The relative positions of the composite part 34 and the support member 30 can be accurately positioned by contacting a protruding portion of the support member 30 described later against the abutted portion 58.

Figure 7:
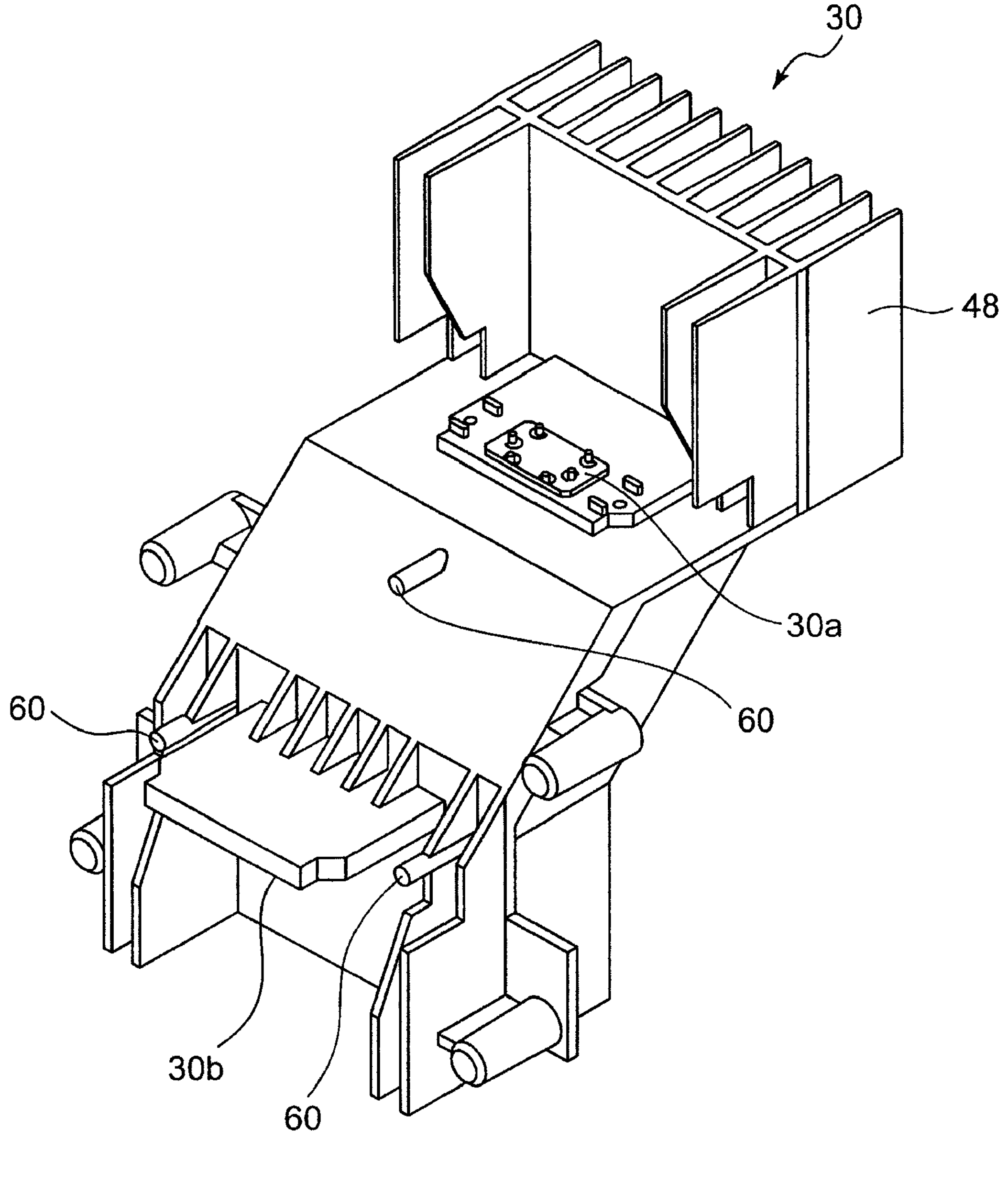
FIG. 7 is a perspective view that shows an overview of a support member according to one or more embodiments.
Figure 8:
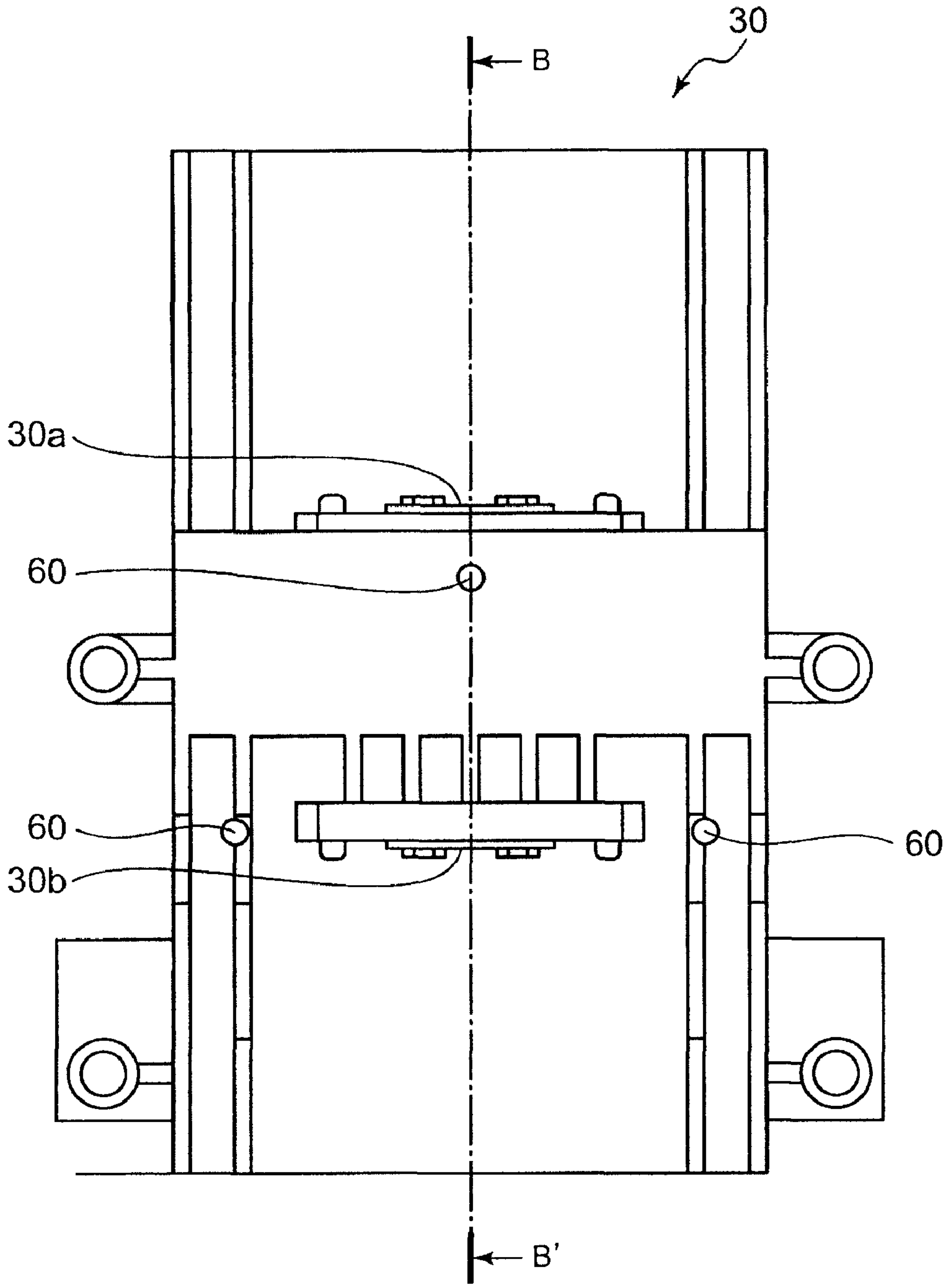
FIG. 8 is a frontal view of the support member as seen from the front.
Figure 9:
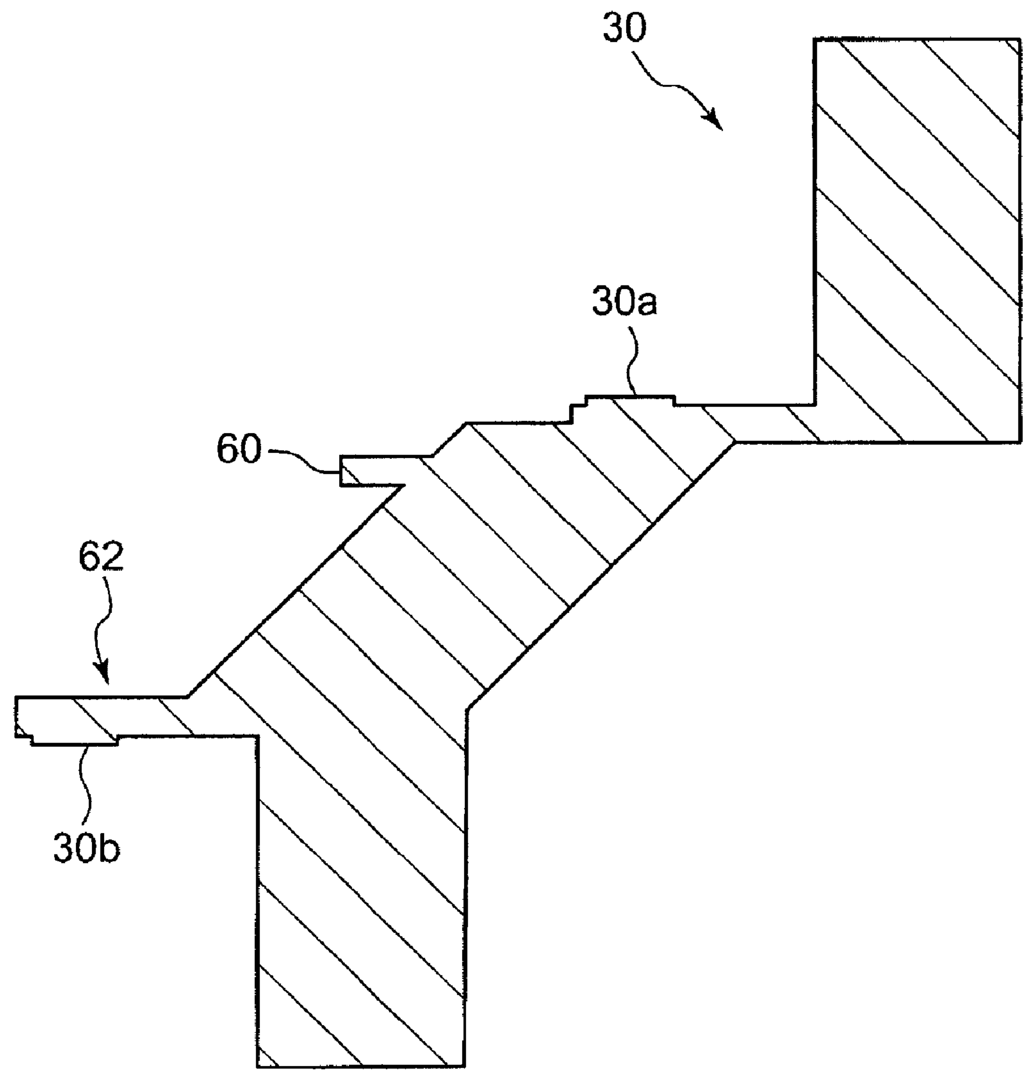
FIG. 9 is a cross-sectional view taken along a line B-B' in FIG. 8.

Next, the support member 30 will be described. FIG. 7 is a perspective view that shows an overview of the support member according to one or more embodiments. FIG. 8 is a frontal view of the support member as seen from the front. FIG. 9 is a cross-sectional view taken along a line B-B' in FIG. 8. In the support member 30, the support surface 30*a* and the support surface 30*b* are respectively mounted with at least the first semiconductor light-emitting element 40 and the second semiconductor light-emitting element 42, and are formed from a metal material. More preferably, in order to thermally connect the support surface 30*a* and the support surface 30*b* to the heat radiation fin 48, a route therebetween may be structured from a metal or other heat-transfer member. Accordingly, the support member 30 increases the heat radiation performance of the semiconductor light-emitting elements, so there is no need to consider the heat radiation performance of the composite part 34. As a consequence, this allows a greater selection of materials and production methods to be able to be used for integral molding of the composite part 34. Thus, costs can be reduced and part accuracy can be improved.

As shown in the drawing, a surface on the vehicle forward side of the support member 30 is provided with a protruding portion 60 at three locations. The relative positions of the composite part 34 and the support member 30 can be accurately positioned by contacting the protruding portion 60 against the abutted portion 58 of the composite part 34 described earlier.

The support member 30 is provided such that an area 62 formed with the support surface 30*b* that supports the second semiconductor light-emitting element 42 projects toward the front of the vehicle. By assembling the composite part 34 and the support member 30 such that the area 62 is inserted into the insertion opening 56 formed in the composite part 34, the second semiconductor light-emitting element 42 fixed on the lower surface side of the support member 30 is positioned facing the reflective surface 52*a* of the second reflector 52. Thus, the second semiconductor light-emitting element 42 supported by the support member 30 can be disposed at a position facing the reflective surface 52*a* of the second reflector 52 without making the configuration of the composite part 34 more complex.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

10 VEHICULAR HEADLAMP APPARATUS
18 LAMP UNIT
18*a* FIRST OPTICAL UNIT
18*b* SECOND OPTICAL UNIT
30 SUPPORT MEMBER
30*a*, 30*b* SUPPORT SURFACE
32 PROJECTION LENS
34 COMPOSITE PART
34*a* CURVED SURFACE
34*b* HORIZONTAL SURFACE
34*c* EDGE LINE
36 FIRST REFLECTOR
36*a* REFLECTIVE SURFACE
40 FIRST SEMICONDUCTOR LIGHT-EMITTING ELEMENT
42 SECOND SEMICONDUCTOR LIGHT-EMITTING ELEMENT
52 SECOND REFLECTOR
54 POSITIONING PORTION
56 INSERTION OPENING
58 ABUTTED PORTION
60 PROTRUDING PORTION

What is claimed is:

1. A lamp unit comprising:
a first semiconductor light-emitting element that serves as a light source;
a second semiconductor light-emitting element that serves as a light source;
a support member that supports the first semiconductor light-emitting element and the second semiconductor light-emitting element;
a first reflector provided above the first semiconductor light-emitting element, which reflects light radiated from the first semiconductor light-emitting element forward;
a shade that blocks a portion of reflected light from the first reflector;
a projection lens provided in front of the first reflector with the shade disposed therebetween, which forms a light distribution pattern with a cut-off line from light reflected by the first reflector;
a positioning portion that positions the projection lens; and
a second reflector provided below the second semiconductor light-emitting element, which reflects light radiated from the second semiconductor light-emitting element forward,
wherein the shade, the positioning portion, and the second reflector are integrally molded as a composite part.

2. The lamp unit according to claim 1,
wherein the shade has a reflective surface that further reflects a portion of light reflected by the first reflector toward the projection lens.

3. The lamp unit according to claim 1,
wherein the composite part is formed with an insertion portion into which the second semiconductor light-emitting element is inserted so as to face a reflective surface of the second reflector.

4. The lamp unit according to claim 1,
wherein at least a portion of the support member mounted with the first semiconductor light-emitting element and the second semiconductor light-emitting element is formed from a metal material.

5. The lamp unit according to claim 2,
wherein the composite part is formed with an insertion portion into which the second semiconductor light-emitting element is inserted so as to face a reflective surface of the second reflector.

6. The lamp unit according to claim 2,
wherein at least a portion of the support member mounted with the first semiconductor light-emitting element and the second semiconductor light-emitting element is formed from a metal material.

7. The lamp unit according to claim 3,
wherein at least a portion of the support member mounted with the first semiconductor light-emitting element and the second semiconductor light-emitting element is formed from a metal material.

8. The lamp unit according to claim 5,
wherein at least a portion of the support member mounted with the first semiconductor light-emitting element and the second semiconductor light-emitting element is formed from a metal material.

9. The lamp unit according to claim 1, further comprising a heat radiation fin thermally connected to the support member.

10. A method of manufacturing a lamp unit comprising:
providing a first semiconductor light-emitting element that serves as a light source;

providing a second semiconductor light-emitting element that serves as a light source;

providing a support member that supports the first semiconductor light-emitting element and the second semiconductor light-emitting element;

providing a first reflector above the first semiconductor light-emitting element, which reflects light radiated from the first semiconductor light-emitting element forward;

providing a shade that blocks a portion of reflected light from the first reflector;

providing a projection lens in front of the first reflector with the shade disposed therebetween, which forms a light distribution pattern with a cut-off line from light reflected by the first reflector;

providing a positioning portion that positions the projection lens; and providing a second reflector below the second semiconductor light-emitting element, which reflects light radiated from the second semiconductor light-emitting element forward, wherein the shade, the positioning portion, and the second reflector are integrally molded as a composite part.

11. The method according to claim 10, wherein the shade has a reflective surface that further reflects a portion of light reflected by the first reflector toward the projection lens.

12. The method according to claim 10, further comprising:

forming the composite part with an insertion portion into which the second semiconductor light-emitting element is inserted so as to face a reflective surface of the second reflector.

13. The method according to claim 10, further comprising:

forming at least a portion of the support member mounted with the first semiconductor light-emitting element and the second semiconductor light-emitting element from a metal material.

14. The method according to claim 11, further comprising:

forming the composite part with an insertion portion into which the second semiconductor light-emitting element is inserted so as to face a reflective surface of the second reflector.

15. The method according to claim 11, further comprising:

forming at least a portion of the support member mounted with the first semiconductor light-emitting element and the second semiconductor light-emitting element from a metal material.

16. The method according to claim 12, further comprising:

forming at least a portion of the support member mounted with the first semiconductor light-emitting element and the second semiconductor light-emitting element from a metal material.

17. The method according to claim 14, further comprising:

forming at least a portion of the support member mounted with the first semiconductor light-emitting element and the second semiconductor light-emitting element from a metal material.

18. The method according to claim 10, further comprising thermally connecting a heat radiation fin to the support member.

* * * * *